Patented Mar. 4, 1930

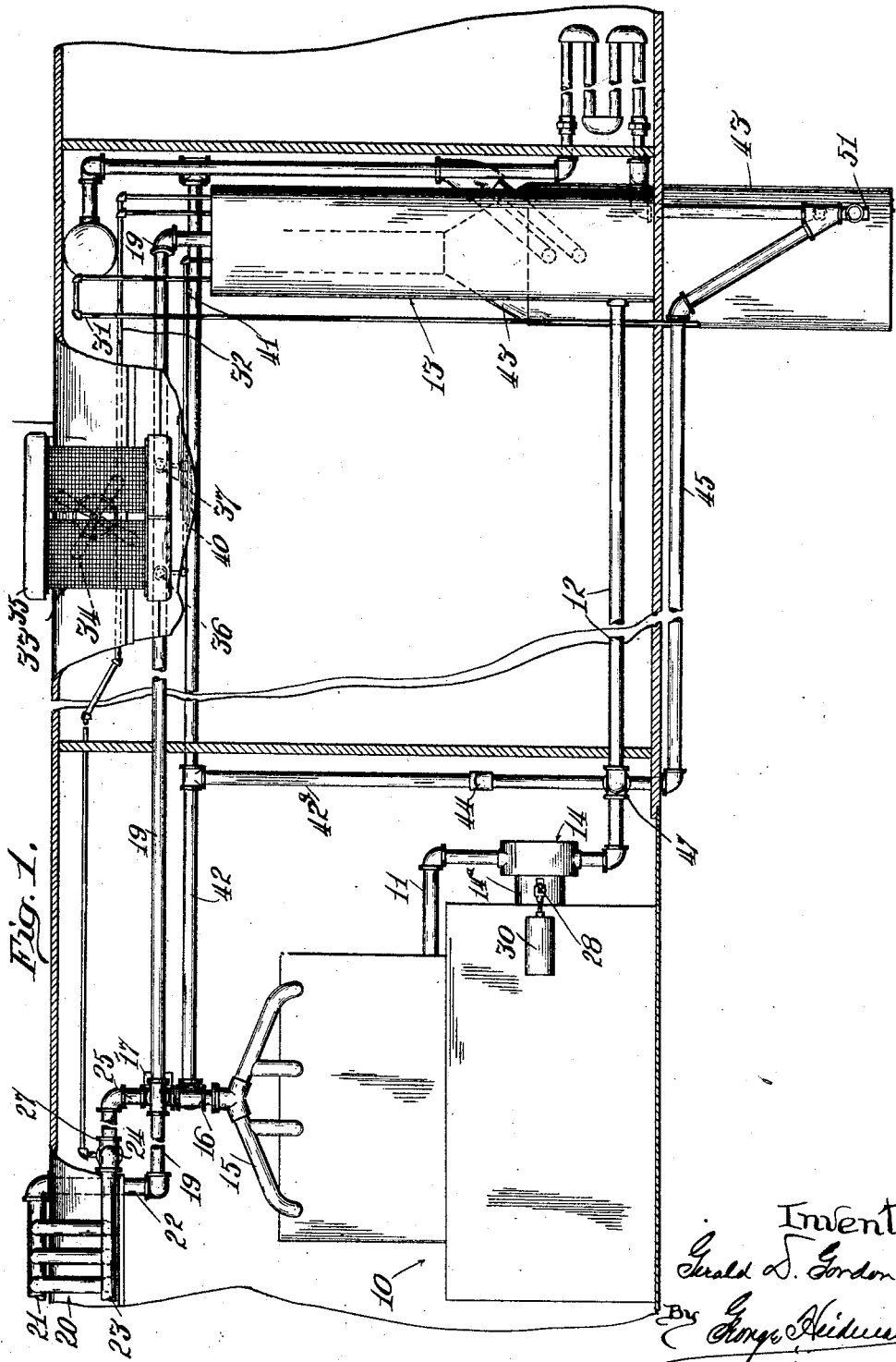

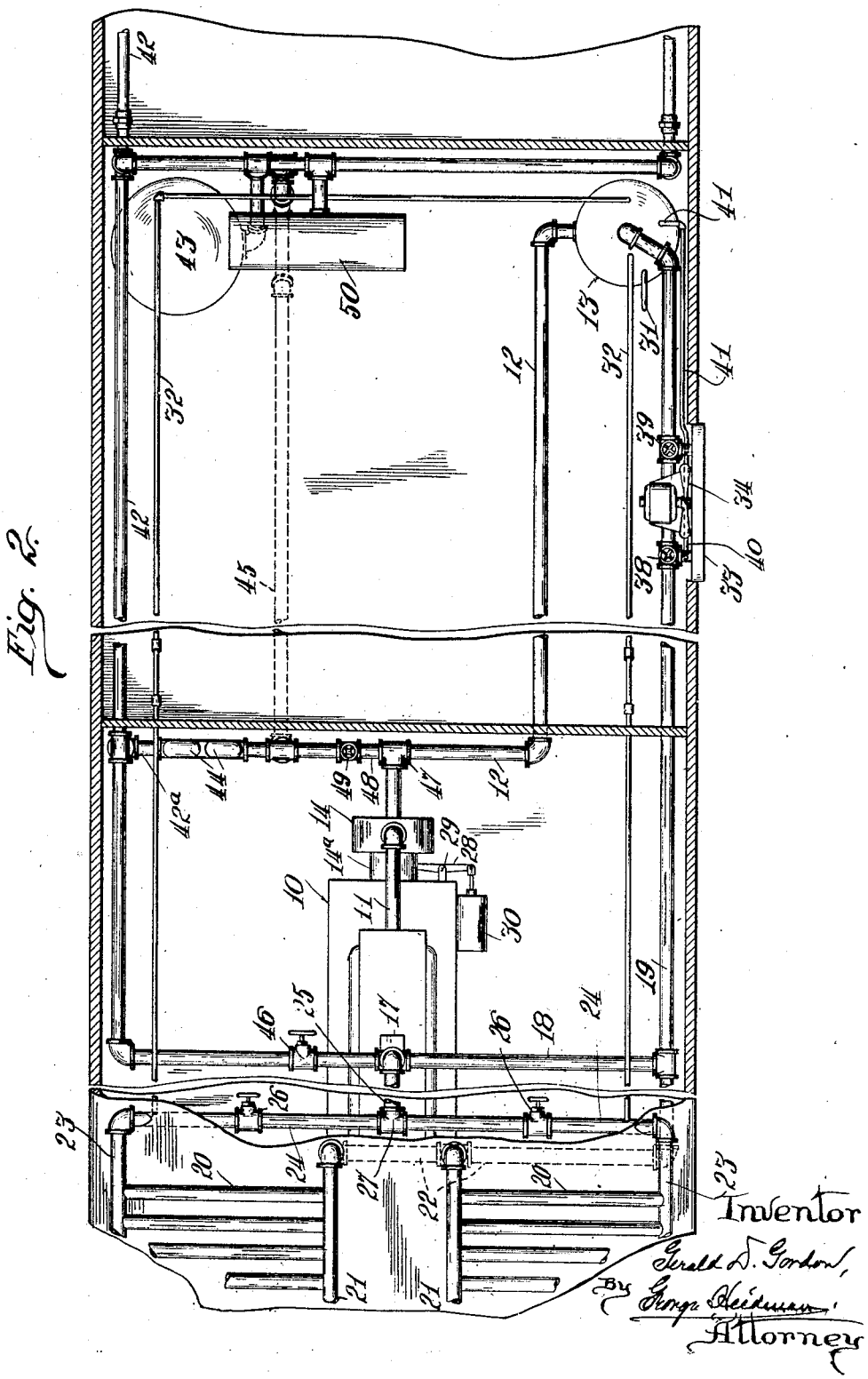

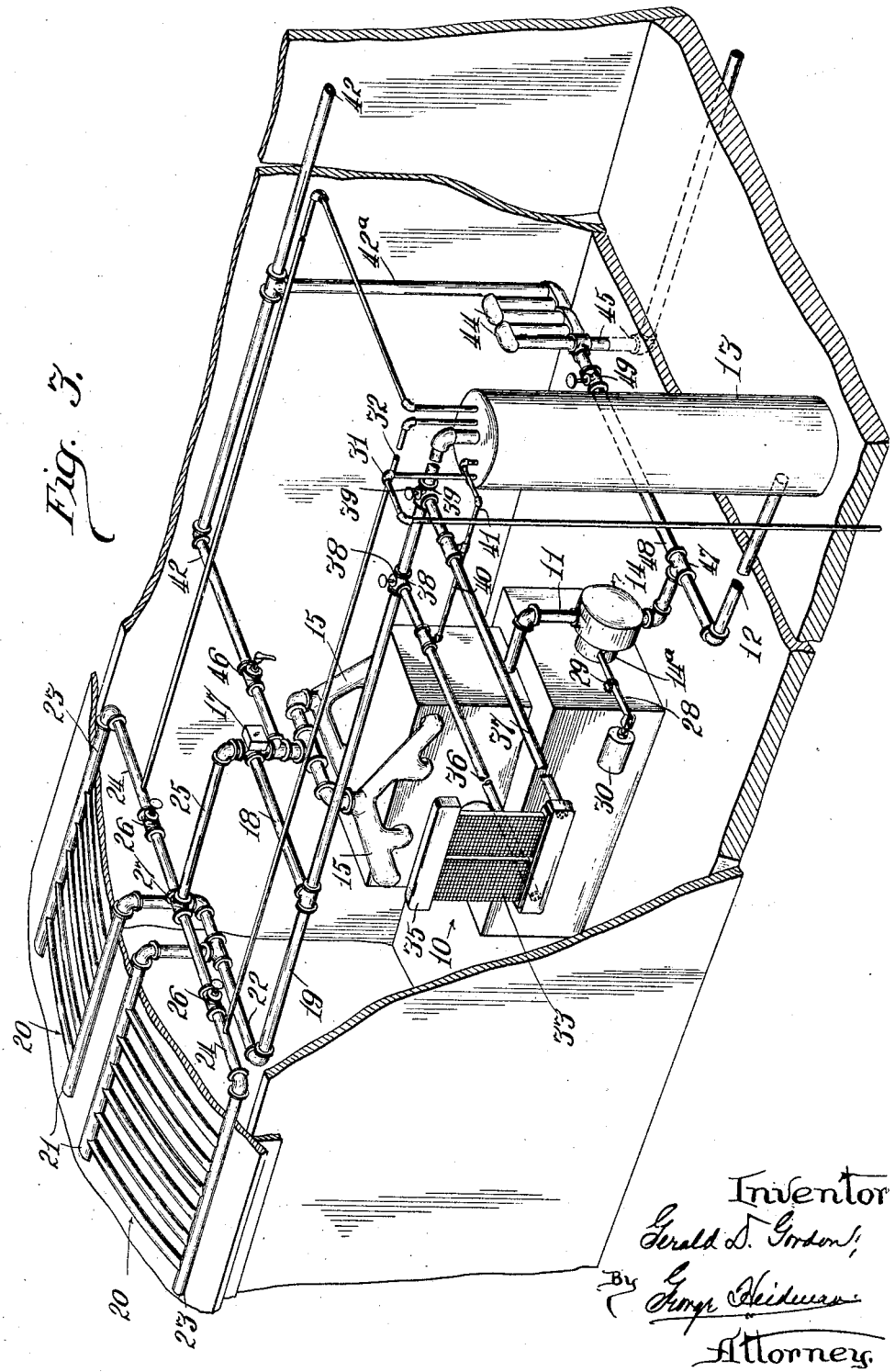

1,749,424

UNITED STATES PATENT OFFICE

GERALD D. GORDON, OF MARION, IOWA

MOTOR HEATING AND COOLING SYSTEM

Application filed May 2, 1927. Serial No. 188,262.

My invention relates to a heating and cooling system especially intended for use with internal combustion motor cars at present in railroad use and has for its object the provision of a system designed to automatically drain the radiator used for the engine or motor when the latter is shut off or stopped, or when the temperature falls below a predetermined degree, in order to provide protection against freezing in cold weather; while at the same time involving means for maintaining the engine or motor temperature at the most efficient operating point or degree.

The invention also has for its object the provision of automatically operable means which may be regulated to function at predetermined temperatures whereby suitable pump mechanism is placed into operative relation with the internal combustion engine, whereby the water supply and the water jackets of the engine, under specific conditions, will be converted into a common thermo-siphon system.

The invention also contemplates a system whereby the hot water of the car heating portion of the system may be brought into circulation and made a part of the engine cooling portion of the system during tie-up or lay-over periods.

The above enumerated objects and advantages, as well as others inherent in the invention, will be more readily comprehended from the detailed description of the drawings, wherein—

Figure 1 is a sectional elevation of a portion of the interior of a motor containing car, with wall portions broken away and in section and illustrating the application of my improved system.

Figure 2 is a plan view.

Figure 3 is a perspective view of the system as arranged within one end of the car, the walls of which are broken away.

10 is the outline of an internal combustion motor, as for example a gas electric motor as employed by railroads, provided with the usual water jackets having the water supply pipe 11, which connects with pipe 12, while the latter communicates with a water supply tank 13, adjacent to the bottom thereof. The water is drawn from tank 13, through pipe 12 by means of a centrifugal pump (or other suitable pump) indicated generally at 14, which forces the water through pipe 11 and the water jackets of the engine 10, from whence it is discharged through outlet pipes 15 which are shown connected by a suitable union or pipe 16, which in turn is provided with a thermostatically controlled valve indicated at 17 and set for operation at a predetermined temperature. The valve 17 is shown provided with a pipe 18 connecting with a return line 19 which leads back to the upper end of tank 13 and again permits circulation of the water through the water jackets of the engine in the manner previously described. The tank 13 in its upper end is preferably provided with a perforated baffle plate (not shown) whereby the water returning through pipe 19 will be divided into fine streams for the purpose of inducing a more rapid cooling thereof.

The centrifugal pump generally indicated at 14 is connected to and driven by the internal combustion engine and then preferably controlled through the medium of a thermostatically operated magnetic clutch 14$^a$ located within or adjacent to the pump housing 14; it being possible to set said clutch so as to hold the pump out of gear until the cooling medium in the jackets of the engine has reached a predetermined temperature, during extreme weather, thereby converting the tank 13 and the water jackets of the engine 10 into a common thermo-siphon system.

The system also involves the radiators 20, 20 on the roof of the car, with the headers 21, 21 of said radiators arranged at the highest elevation and connected by suitable couplings and pipes 22 with the return line 19; while the headers 23, 23 at the lowest part of the radiators have a common connection 24 which connects with a pipe 25.

The common connection or pipe 24 is provided with two valves 26, 26 which are used for cutting out either radiator section at the will of the operator. The reason for the valves 26, 26 is to provide means for reducing the effective cooling area at times when extremely cold side winds are encountered during operation. The valves 26 are located between the headers 23 and the common junction point between lines 24 and 25, indicated at 27; said junction 27 connecting with the thermostatically controlled valve indicated at 17.

It will be seen from the construction shown and described that the heated water from the motor passes upward through the outlet pipes 15, through union 16, then through the thermostatically controlled valve 17, into pipe 25, thence into union 27 and pipe 24, which in turn connects with the headers 23, allowing circulation through the respective radiator sections into headers 21, which are at the highest point of the radiator system; the water then returning by gravity into pipe 22, leading into pipe 19 and thence back into the top of tank 13. In this operation it will be understood that the thermostatically controlled valve 17 has been set to register or establish communication with the pipe 25, while the connection between pipe 16 and the auxiliary return pipe 18 is closed.

Thermostatically controlled valve 17,—the function of which is to keep the water from entering headers 23, unless set as before described to register with pipe 25,—also functions to close the outlet between pipe 16 and pipe 25 when water temperatures are below the point for which thermostatically controlled valve 17 is set, in which case pipe 16 will be placed in communication with pipe 18 thereby providing a direct return of the water through pipes 18, 19 and directly to tank 13.

Centrifugal pump 14 is designed to operate through a suitable clutch 14ª, which is operated either pneumatically, magnetically or manually as desired. This clutch 14ª is controlled in the particular exemplification by lever 28, fulcrumed at 29, with the end thereof connected to the actuating medium 30, which may be controlled pneumatically, manually or otherwise. Should it be desired to control clutch 14ª thermostatically, centrifugal pump 14 will not be placed in operation until the temperature of the water has reached a predetermined degree. As the construction of pump 14 is of the usual centrifugal type and will allow water to freely pass through when standing idle, this will permit the system,—comprising tank 13, pipe 12, centrifugal pump 14, pipe 11, pipes 15, 16, valve 17, pipes 18 and 19, thence back to tank 13,—to operate as a common thermo-siphon system; it being understood that the highest point on overflow pipe 31 is not less than three inches above the level of pipe 19, thereby ensuring pipe 19 and tank 13 always remaining full of water. At the same time, it will be understood that the highest point of overflow pipe 31 must be sufficiently below the level of headers 23 of the radiator systems to ensure proper drainage which is accomplished by means of drain pipe 32 connecting with the two pipes 24 intermediate of the valves 26 and the headers 23; the drain pipes 32 in turn connecting with the top of tank 13.

It will be understood that the capacity of tank 13 should be such that the tank may hold all the water of the radiators, the headers and the pipes leading thereto, when the power plant or motor is standing idle and all the water above the level of pipe 19 has drained back to the tank 13 by gravity. On the other hand, when the power plant or motor is in operation and the radiators are functioning and full of water—which is drawn from tank 13—there should still be a reserve supply, for example, of not less than fifty gallons of water in tank 13; this reserve supply to be further increased when the cooling system is used where extremely hot weather conditions prevail or where extra large power plants are installed.

For the purpose of providing additional cooling area where heavy duty power plants are used and extreme summer temperatures are encountered, the system is shown provided with a radiator indicated at 33, which may be cooled by a fan indicated at 34, driven by any suitable medium. Radiator 33 preferably consists of two sections connected at top by a header 35; one section of the radiator being fed by ingoing line 36 which enters at the bottom of the section, the water passing through header 35 to the adjacent section and thence out through pipe 37; the pipes 36 and 37 both connect with line 19 and are controlled by means of valves 38 and 39. Normal operation of the system,—which does not require the use of the additional cooling area provided by radiator 33,—is carried on by closing valves 38 and 39; these valves being preferably of the three-way valve design which will provide direct communication from pipe 19 to tank 13 while closing off pipes 36 and 37. During the period of operation, when cooling radiator 33 is not in use, small pipes 40 and 41 provide gravity connection which permits all water to drain into tank 13; it being understood that the lowest point in the cooling radiator 33 is above the level of pipe 19, which therefore will prevent possibility of water freezing in the cooling radiator 33.

The system thus far described constitutes the cooling system proper; the heating system and its relation to the cooling system will now be described.

Pipe 42 is connected to the highest point in the hot water heating system; the lower portion thereof being shown at 43 in Figures 1 and 2. The heater consists of the usual type of hot water heater used in car heating service; the normal operation whereof, when operated as a straight heating system and not in connection with the cooling system, provides circulation from heater 43 through pipes 42, 42ª, coil 44 and pipe 45 which returns to heater 43 and provides circulation in this part of the heating system at all times to prevent freezing. The heater connected as described through the medium of pipes 42, 42ª, coil 44 and pipe 45 (which returns to the lowest point of heater 43), is the normal thermo-siphon principle. When employed as a protective means for the engine water-jackets and its attached piping during tie-up or lay-over periods, when danger of freezing might exist, connection has been afforded by extending pipe 42 to a valve 46 which permits pipe 42 to be placed in communication with pipe 16, but at a point below the thermostatically controlled valve 17. The circulation afforded when valve 46 is opened, permits hot water from heater 43 to flow through pipe 42, valve 46, pipes 16 and 15 into the cooling jacket of motor 10, thence out through pipe 11, through pump 14 and by means of a T-coupling 47 and pipe 48 through valve 49, (which must be opened) through pipe 45 returning to heater 43, thereby providing thermo-siphon circulation of the hot water as described.

The heater 43 is installed and connected to the car heating system proper as will be found in general practice on all railroad cars which are equipped with hot water heaters; a portion of my invention consisting in the connection between the car heating system and the engine cooling system which is effected by means of pipes 42, valve 46, pipe 11, pump 14, pipe 48, valve 49, pipe 45; coil 44 being installed for the purpose of providing circulation through heater 43, pipes 42, 43ª, coil 44 and pipe 45 to ensure against freezing.

It will be understood that the capacity of pump 14 will be predetermined or so estimated that headers 21, pipes 22 and 19, valves 38 and 39 will be of sufficient area to provide a gravity return of water delivered by pump 14 so as to overcome any possibility of high pressures accummulating in radiator pipes 20.

It will be understood that suitable temperature indicators or thermometers may be located at suitable points in the engine cooling system proper to assist the operator in determining or maintaining the proper temperatures. 50 represents the ordinary expansion tank generally employed in the usual hot water system.

Provision for draining the entire heating and cooling systems can be made by placing drain valves at the lowest points in each system, as for example at 51, in Figure 1.

When the radiators 20 are cut out through action of thermostatically controlled valve 17, or manually operated valve 26—namely when the temperature of the cooling water is below the predetermined temperature for which valve 17 is set—any water remaining in radiators 20 will drain back into tank 13 through drain pipes 32. It will be understood that the pipes 32 must not be of a capacity great enough to affect the water supply delivered by pump 14 when the radiators 20 are connected into the cooling system by valve 17.

The system as disclosed in the drawings has been found to operate very efficiently and produces the desired results; certain modifications, however, may be possible without departing from the spirit of my invention which has been described in terms employed merely as terms of description and not as terms of limitation.

What I claim is:

1. A system of the character described comprising, in combination with a water-cooled engine, a water supply tank capable of holding all of the water of said system, radiator sections arranged above the level of the water-jackets of said engine, said sections being independently controllable, an automatically controlled pump having connection with the lower end of said tank and with the lowest point of water-jacket of said engine, temperature controlled mechanism intermediate of the pump and the engine whereby the pump is placed into operative relation with the engine when a predetermined temperature is reached, a common connection between the upper ends of said water-jackets and the lowest points of said radiator sections, means for separately controlling the flow to the different radiator sections, a return line intermediate of the highest points in said radiator sections and the upper end of said tank, thermostatically controlled means in said common connection, a by-pass intermediate of said thermostatically controlled means and said return line whereby water from the water jackets of the engine may be made to circulate through said radiator sections before returning to said tank when the temperature is above a predetermined degree and made to flow through said by-pass and back to said tank when the temperature is below said predetermined degree.

2. In a system of the character described, the combination of a hot water car heating system and a water-cooled engine, with a water storage tank located within the car and adapted to store all of the water normally contained in said system and to compensate for water loss in operation, radiator sections arranged on the car roof above the level of the water-jacket of the engine with the inlet ends of the sections in a plane below that of the outlet ends of the radiator sections and the outlet ends in a plane above the top of the tank, automatically controlled pump mechanism having connection with the lower end of said tank and with the lowest point in the water-jacket of the engine, automatic means for placing said pump mechanism into operative relation with the engine when the temperature reaches a predetermined degree, a connection between the top of said water jacket and the inlet ends of the radiator sections, a return line intermediate of the outlets of the radiator sections and the upper end of said tank, thermostatically controlled means in said connection adjacent to the outlets of the water-jackets, a connection between said means and said return line whereby water from the water-jacket is made to flow through said radiator sections when its temperature is above a predetermined degree or caused to flow through said last named connection to the return line when the water temperature is below a predetermined degree, a controllable connection between the pipe of the car heating system and said first mentioned connection in advance of said thermostatically controlled means whereby heated water from said car heating system may flow directly into the water-jacket of said engine without passing through the cooling portion of said system, a drain connection intermediate of the inlet ends of the radiator sections and the top of the tank of a capacity less than the capacity of the connection between the water-jackets and the inlet ends of the radiator sections, an auxiliary water-cooling means in advance of the connection between said return line and the tank, and controllable means whereby water from said return line may be made to pass through said auxiliary cooling means in advance of its discharge into said tank.

GERALD D. GORDON.